United States Patent [19]
Kanekal

[11] Patent Number: 5,931,932
[45] Date of Patent: Aug. 3, 1999

[54] DYNAMIC RETRY MECHANISM TO PREVENT CORRUPTED DATA BASED ON POSTED TRANSACTIONS ON THE PCI BUS

[75] Inventor: Hemanth G. Kanekal, San Jose, Calif.

[73] Assignee: Cirrus Logic, Inc., Fremont, Calif.

[21] Appl. No.: 08/873,883

[22] Filed: May 12, 1997

[51] Int. Cl.⁶ ....................................... G06F 13/14
[52] U.S. Cl. ............................ 710/113; 710/36; 710/108; 710/110; 710/107; 710/126; 710/128; 710/129; 710/130; 711/147; 711/167
[58] Field of Search ................................ 395/308, 306, 395/287, 309, 310, 290, 288, 856, 200.13, 775, 473; 711/167, 147; 710/128, 126, 107, 129, 130, 110, 108, 36, 113

[56] References Cited

U.S. PATENT DOCUMENTS

| | | | |
|---|---|---|---|
| 5,519,872 | 5/1996 | Khandekar | 395/775 |
| 5,627,970 | 5/1997 | Keshav | 395/200.13 |
| 5,659,709 | 8/1997 | Quach | 395/473 |

*Primary Examiner*—Glenn A. Auve
*Assistant Examiner*—Frantz Blanchard Jean
*Attorney, Agent, or Firm*—Frank D. Nguyen

[57] ABSTRACT

A method and apparatus to prevent data from being corrupted prior to reaching the final destination is provided. The method and apparatus monitors the status of posted write transactions and transaction initiations. If it is determined that a posted write transaction is incomplete and there is a pending transaction initiation, a bus retry is requested for the pending transaction.

19 Claims, 9 Drawing Sheets

DYNAMIC RETRY MECHANISM TO PREVENT CORRUPTED DATA BASED ON POSTED TRANSACTIONS ON THE PCI BUS

FIELD OF THE INVENTION

The invention generally relates generally to network controllers in computer systems, and more particularly to a controller coupled to the Peripheral Component Interconnect (PCI) Local Bus.

BACKGROUND OF THE INVENTION

In the area of digital systems, the task of accommodating increasing bus traffic continues to pose a challenge. The primary bottle-neck in most bus transactions appears to be the system bus. The system bus is a bottle-neck primarily because many devices share the same bus and must contend for its resources.

Figure 1:
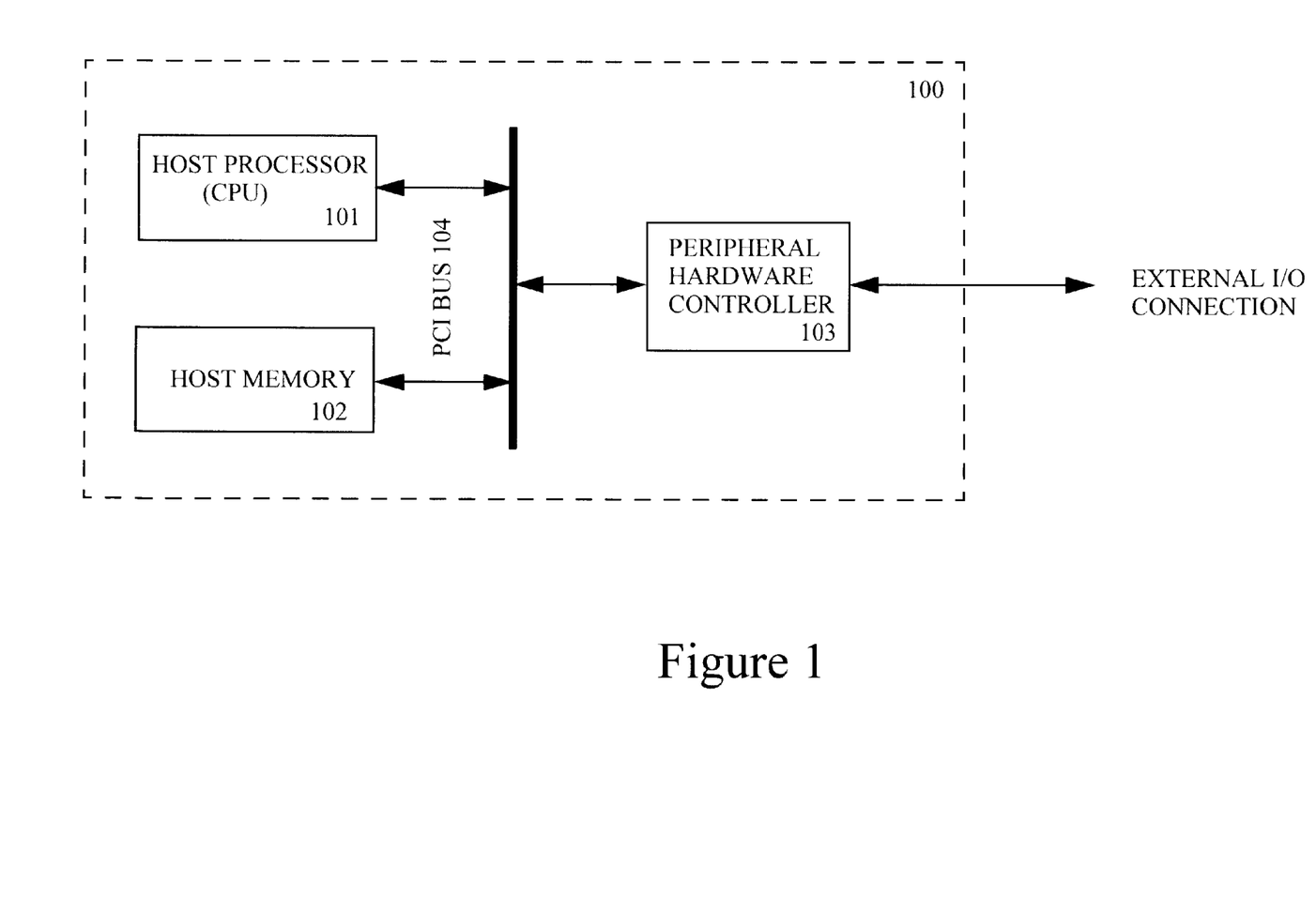
FIG. 1 is a block diagram illustrating a typical computer system that uses PCI bus in the computer system.

The PCI bus is a high performance, 32-bit or 64-bit bus with multiplexed address and data lines which can accommodate multiple high performance peripherals. The PCI Bus supports burst modes in which a bus transaction may involve an address phase followed by one or more data phases in tandem with a command phase followed by one or more byte enable phases. As such, an external device may require the use of the bus for multiple clock cycles during a bus transaction which can exacerbate bottle-neck problems associated with a system bus. Reference is now made to FIG. 1 which illustrates an overview of a computer system that utilizes the PCI bus. In FIG. 1, computer system 100 comprises host CPU 101, host memory 102, peripheral hardware controller 103, and bridge device 105. Peripheral hardware controller 103 is coupled to host CPU 101 and host memory 102 through PCI bus 104. More particularly, peripheral hardware controller 103 provides an interface between PCI bus 104 and external devices such as disk drivers, display monitors, parallel data port, local area network, wide area network, or the like.

In general, host CPU 101 and external devices may take turns controlling PCI bus 104 in carrying out transactions such as read and write transactions. While a device which takes control of PCI bus 104 to initiate the transaction is known as a "bus master" device, a device at the other end of the transaction is known as a "bus target" (or "slave") device. Information that are involved in bus transactions between devices include data, address, commands, byte enables, and identification of bus master and bus target device.

While a bus may be synchronous or asynchronous, PCI bus is a synchronous bus. In other words, information flowing from the bus master device to the target device and vice versa are synchronized to a system clock such that a bus transaction must take place in an integral number of synchronized clock cycles. In carrying out bus transactions, bus protocols must be followed. These protocols consists mainly of bus mastership, requests for read or write transactions, and acknowledgment of such requests. PCI bus protocols can be found in "The PCI Local Bus Specification Rev 2.1", published by the PCI Special Interest Group, P.O. Box 14070, Portland, Oreg. 97214 and incorporated herein by reference.

When host CPU 101 performs a write transaction to a device connected to the PCI bus 104 such as peripheral hardware controller 103, the write transaction is considered complete when data information is sent to the device. In general, when peripheral hardware controller 103 receives the data from host CPU 101, the data is first stored in a temporary buffer such as a first-in-first-out (FIFO) buffer before being transferred to a final destination such as a local memory inside peripheral hardware controller 103. The FIFO buffer is used to prevent data loss or corruption that may occur, for example, when the local memory is full or the bus connecting the local memory to the buffer is temporarily busy and new data is coming in from host CPU 101. However, data loss can still occur, for example, if new data is coming into a full FIFO buffer and the FIFO buffer can not empty its content into the local memory because the local bus is temporarily busy. As a result, the data may be corrupted before reaching the local memory.

Figure 2:
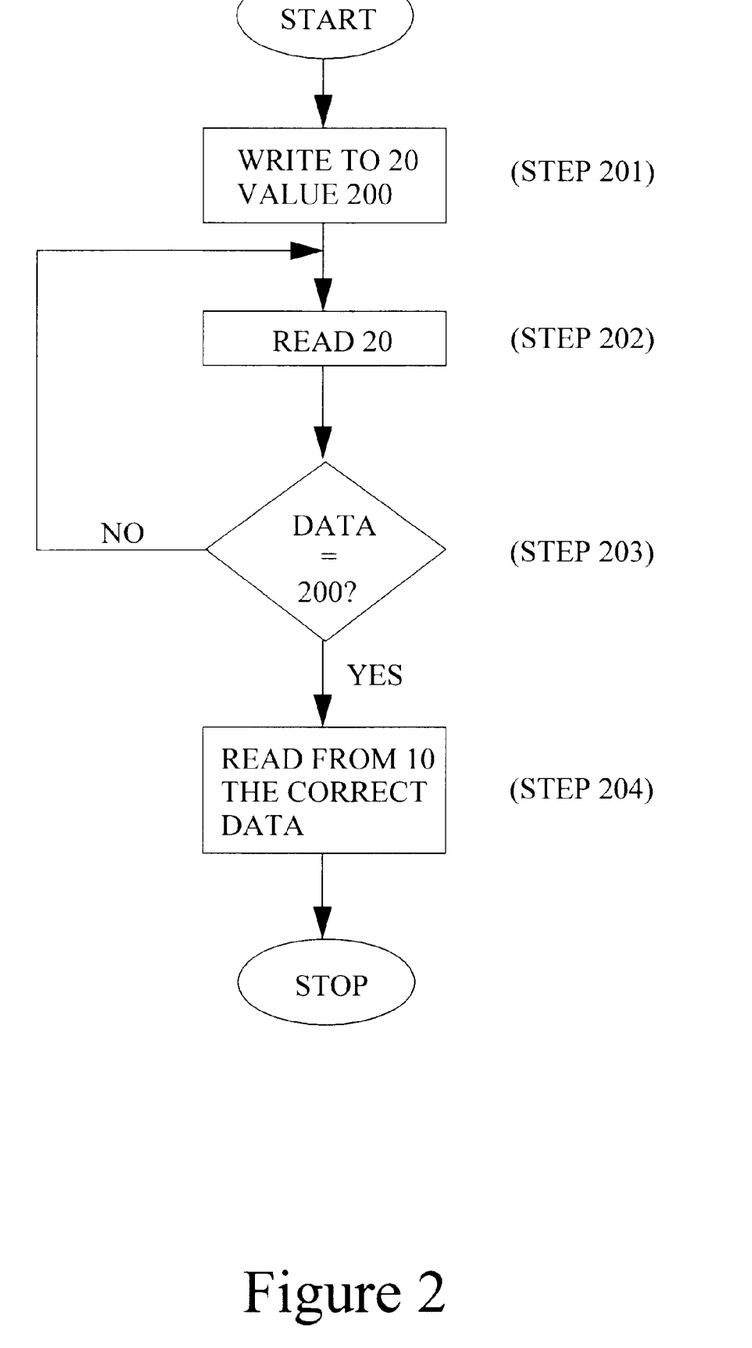
FIG. 2 is a block diagram illustrating a flow chart of an exemplary software driver used to determine whether data has actually reached its intended final destination.

To ensure that the data retrieved from the final destination is not corrupted, a software driver is used in the Prior Art to determine whether the data has actually reached its intended final destination and therefore not corrupted. Referring now to FIG. 2 illustrating a flow chart of an exemplary software driver used to determine whether data has actually reached its intended final destination. Suppose that host CPU 101 performs a write transaction of the value 100 into address 10 of the local memory inside peripheral hardware controller 103. Further suppose that the data to be stored at memory address 10 is processed through a logical or arithmetical operator before reaching its final destination at memory address at 10. Immediately following this write transaction, host CPU 101 requests and gains control of the PCI bus to execute the software driver stored in memory 102. In step 201, a known value is written into address 20 of the local memory (step 201). The content of address 20 is retrieved in step 202. Because the write transaction to address 20 occurs after the write transaction to address 10, if the content of address 20 matches the known value following step 203, it can be safely assumed that the value of 100 has actually reached the final destination (i.e., address 10 of the local memory). Hence, a read transaction of address 10 is performed (step 204). Otherwise, go back to read address 20 again. As shown in FIG. 2, at least four instructions must be executed before a determination can be made. At a few clock cycles per instructions, using a software driver to determine whether the data actually reaches the final destination is very inefficient. The inefficiency is even greater if the clock cycles needed for bus arbitration are included.

Hence, there is a need for an apparatus, system, and method to efficiently determine whether data actually reached the final destination without being corrupted.

SUMMARY OF THE INVENTION

Accordingly, the present invention provides an apparatus, system, and method to efficiently determine whether data actually reached the final destination without being corrupted.

The present invention meets the above need with an apparatus to prevent data sent to a target device over a bus from being corrupted prior to reaching a final destination. The apparatus comprises: a first circuit and a second circuit.

The first circuit is coupled to the target device and the bus. The first circuit determines whether a write transaction is incomplete and whether there is a bus transaction initiation for the target device indicating that the target device is receiving new data. The second circuit is coupled to the first circuit. The second circuit generates a back-off signal to be used in generating a bus retry signal when the write transaction is incomplete and there is a bus transaction initiation for the target device.

All the features and advantages of the present invention will become apparent from the following detailed description of its preferred embodiment whose description should be taken in conjunction with the accompanying drawings.

BRIEF DESCRIPTION OF THE DRAWINGS

Prior Art

Prior Art

Table 1 is a summary of the different states and their results in accordance with the present invention.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Figure 3:
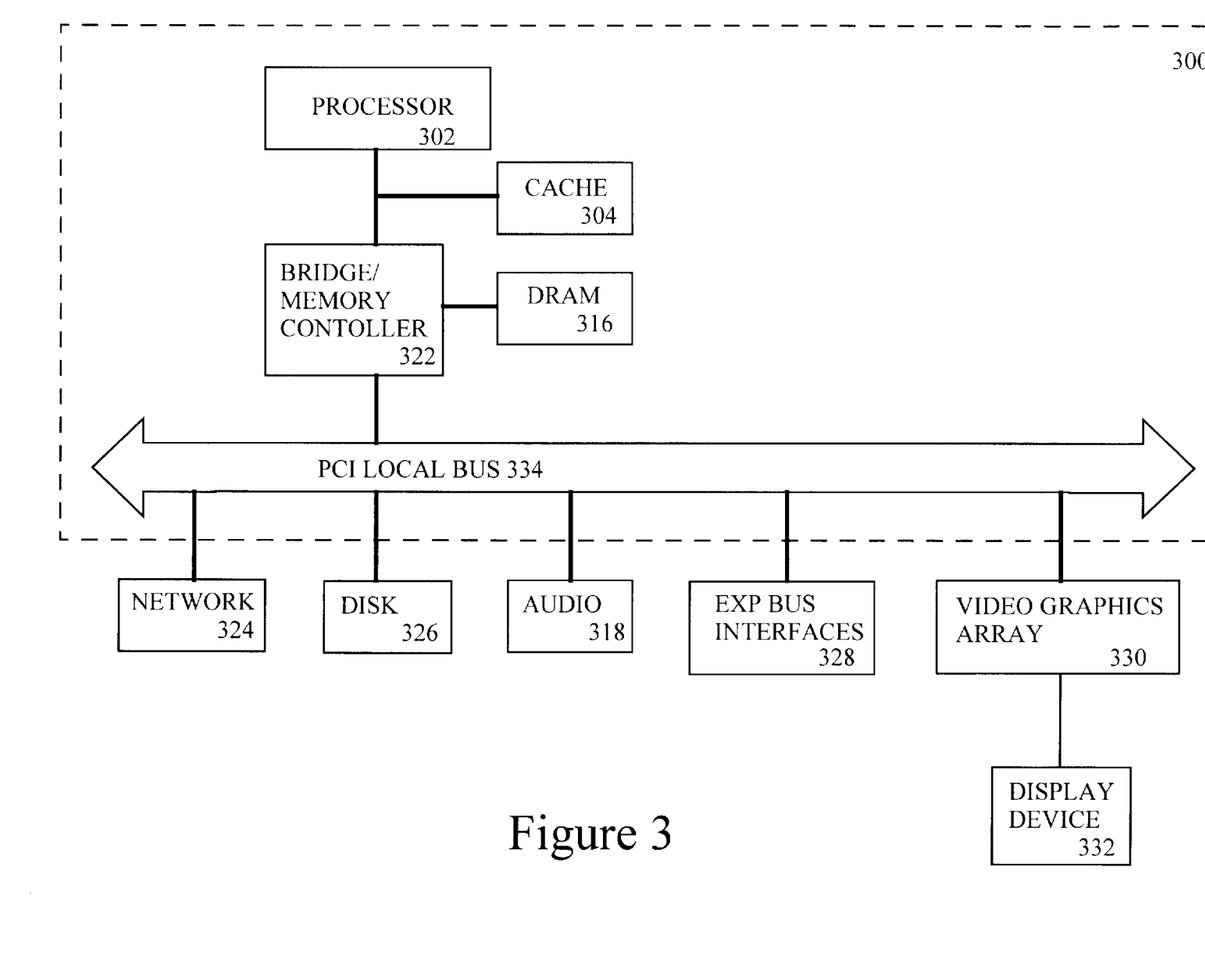
FIG. 3 is a block diagram illustrating a computer system implementing the present invention.

Reference is now made to FIG. 3 illustrating a block diagram of computer system 300 utilizing aspects of the present invention. Computer system 300 comprises a host processor system chip set which includes host processor 302, cache memory 304, bridge/memory controller 322, and dynamic random access memory 316. Host processor 302 may be any one of a number of commercially available microprocessors such as those marketed by Intel® (Santa Clara, Calif.) and Motorola® (Schaumburg, Ill.). PCI bus 334 couples bridge-memory controller 322 to a number of external devices such as local area network controller 324, hard disk controller 326, audio controller 318, video graphics array 330, and other expansion bus interfaces 328. Video graphics array 330 may drive display device 332 such as a monitor or a liquid crystal display device.

Bridge/memory controller 322 is used to directly access any external device coupled to PCI bus 334. Generally, such external devices are mapped in memory or I/O address spaces. Bridge/memory controller 322 also performs data buffering/posting and PCI bus central functions (e.g., arbitration). While bridge/memory controller 322 may be considered as a PCI bus master, any of the external devices coupled to PCI bus 334 may also act as a bus master.

Although the present invention is practiced in a PCI bus environment, it is to be understood that the invention is applicable to any type of synchronous system bus with appropriate protocols. Furthermore, while the present invention has applicability in network controllers such as LAN controllers and the like, the best mode, it is to be understood that the invention is applicable to any peripheral controllers such as disk controllers, audio controllers, graphics controllers etc.

Figure 4:
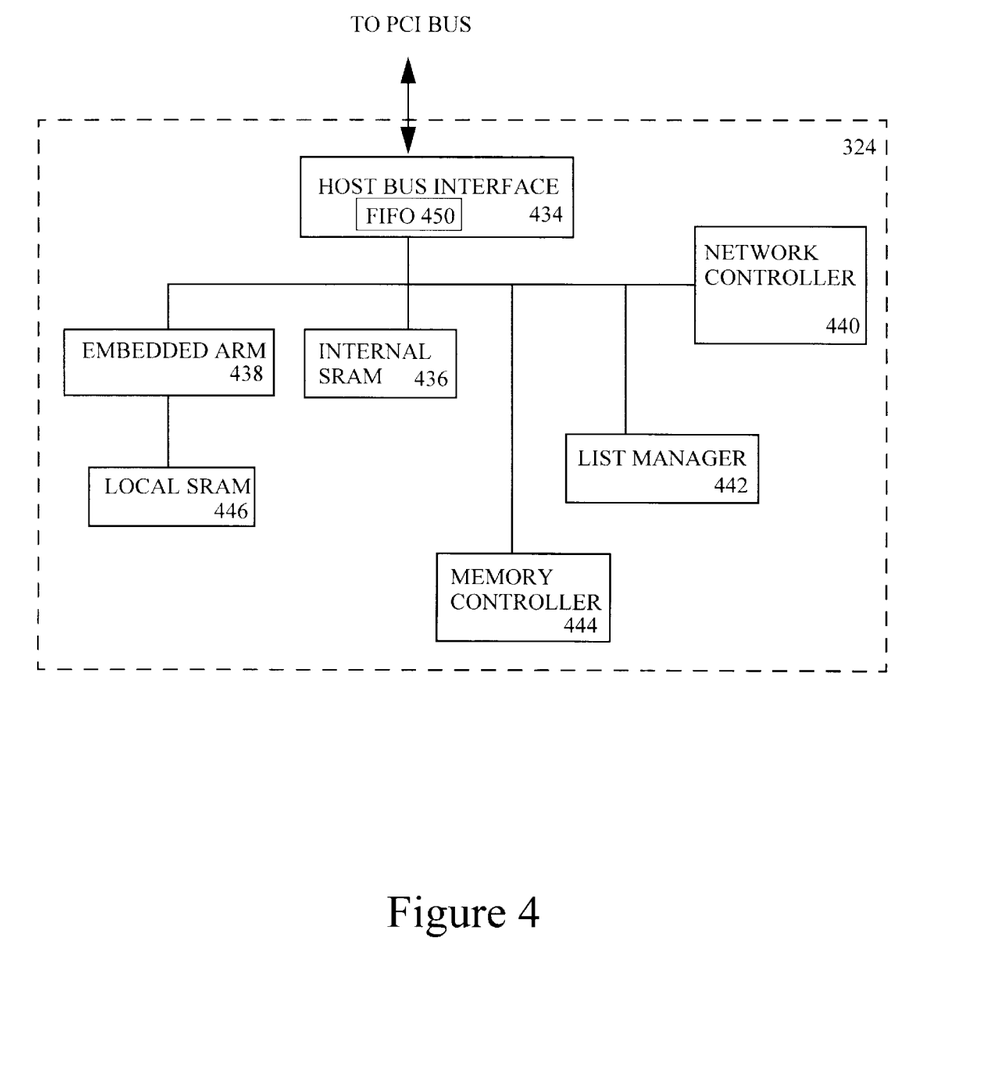
FIG. 4 is a block diagram of the network controller in the computer system of FIG. 3.

FIG. 4 is an overall block diagram of network controller 324. Host bus interface 434 connects network controller 324 to PCI bus 334. In addition to performing address decoding to access I/O devices and memory locations, host bus interface responds to applicable CPU commands and controls. The present invention resides inside host bus interface 434. Host bus interface 434 has a FIFO buffer 450 which is used to temporarily store data received from PCI bus 334 before sending them to their final destination such as internal SRAM 436 or an external memory (not shown). As is well-known in the art, FIFO buffer 450 has a switch that can be preset to trigger a signal when data inside FIFO buffer 450 reaches a desired level. Embedded ARM processor 438 is a local processor which helps to offload central processor 302 in terms of processing. ARM processor 438 helps to direct data traffic inside network controller 424.

Network controller interface 440 provides the interface to communications networks to which network controller 424 is connected to. List manager 442 controls the transfer of data to and from internal static random access memory (SRAM) 436. When network data signals come in from communications networks, list manager 442 formats and stores the data into internal SRAM 436. List manager 442 also communicates with ARM processor 438 about the occurrence of certain activities. In response, ARM processor 438 executes instruction codes stored in local SRAM 446 to perform predetermined tasks. Memory controller 444 is connected to an external dynamic random access memory (DRAM) (not shown). Memory controller 444 retrieves from the external DRAM additional instruction codes, which when executed by ARM processor 438 carry out additional tasks.

Figure 5:
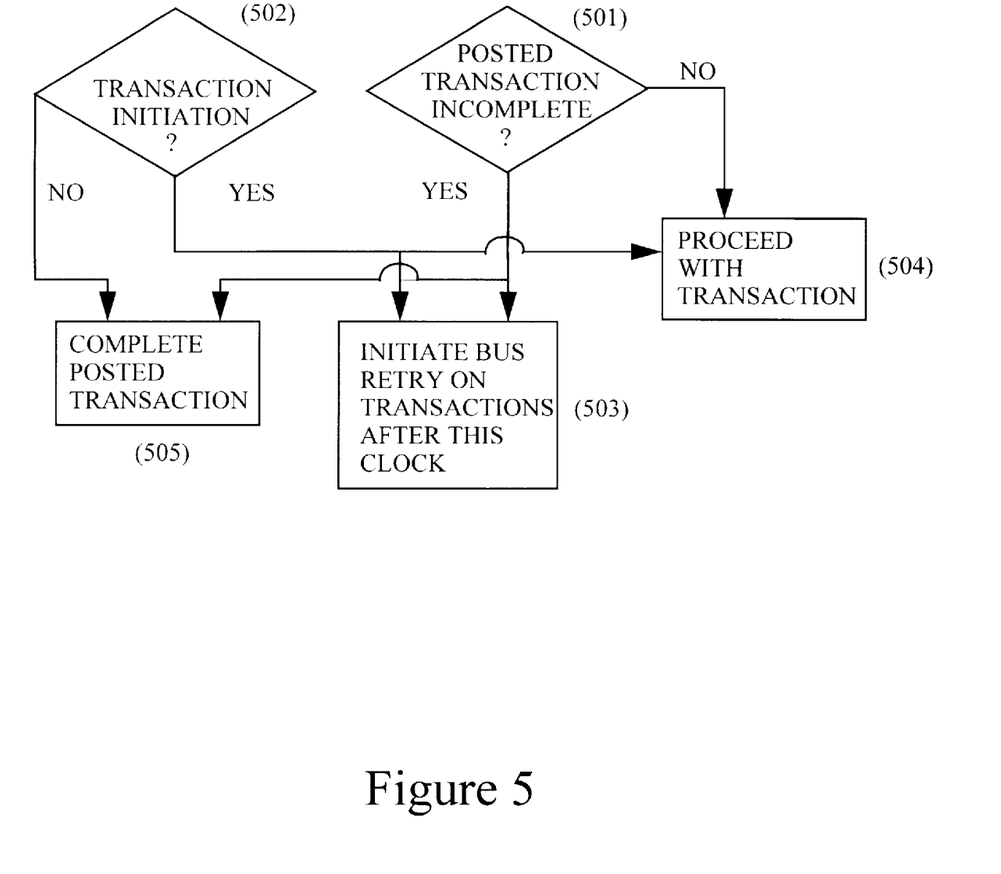
FIG. 5 is a flow chart of the steps carried out by the hardware implementation in accordance with the present invention..

In accordance with the present invention, when there is a posted write transaction and a transaction initiation, a bus retry is requested. In other words, when the transaction is complete on the PCI bus and the data is in an internal buffer (e.g., a FIFO) of the target device and there is new data coming in from the bus, a signal is generated on the PCI bus to stop the transaction initiated and to request that the transaction request be resent at a later time. Referring now to FIG. 5 illustrating a flow chart of the steps carried out by the hardware in accordance with the present invention. In step 501, the current invention monitors the target device to determine whether a posted write transaction is incomplete (i.e., whether data has transferred from the PCI bus to an internal buffer of the target device but has not yet reached the final destination). At the same time, in step 502, the current invention determines if there is a bus transaction initiation which indicates that new data is being sent over the bus to the target device. If the posted transaction is incomplete and there is a transaction initiation, the data temporarily stored in the internal buffer may be written over and become lost. As such, the current invention initiates a bus retry for the bus transaction starting at the next clock (step 503). A bus retry is a signal to tell the host CPU to back off and to try the transaction again at a later time. If the posted transaction is complete and there is a bus transaction initiation which indicates that new data is being sent over the bus to the target device, then there is no data temporarily stored in the internal buffer to be corrupted and the transaction initiation proceeds as normal. If the posted transaction is complete and there is no bus transaction initiation, then it is obvious that nothing needs to be done. Similarly, if the posted transaction is incomplete and there is no bus transaction initiation, then, nothing needs to be done on the PCI bus, because even though there is data in the FIFO buffer, there is no new data coming in to corrupt it. Eventually, the data in the FIFO is transferred to the final destination to complete the posted transaction (step 505).

Table 1 below summarizes all the combinations and their results discussed in the above paragraph. As illustrated in Table 1, there are three columns: transaction initiation?, posted transaction incomplete?, and action internal to Network Controller 324. Depending on whether there is a transaction initiation and whether the posted transaction is incomplete, the appropriate action is taken.

TABLE 1

| Transaction Initiation? | Posted Transaction Incomplete? | Action internal to Network Controller 324 |
| --- | --- | --- |
| No | No | Do Nothing |
| No | Yes | Complete Posted Transaction |
| Yes | No | Proceed with Transition |
| Yes | Yes | Bus Retry |

Figure 6:
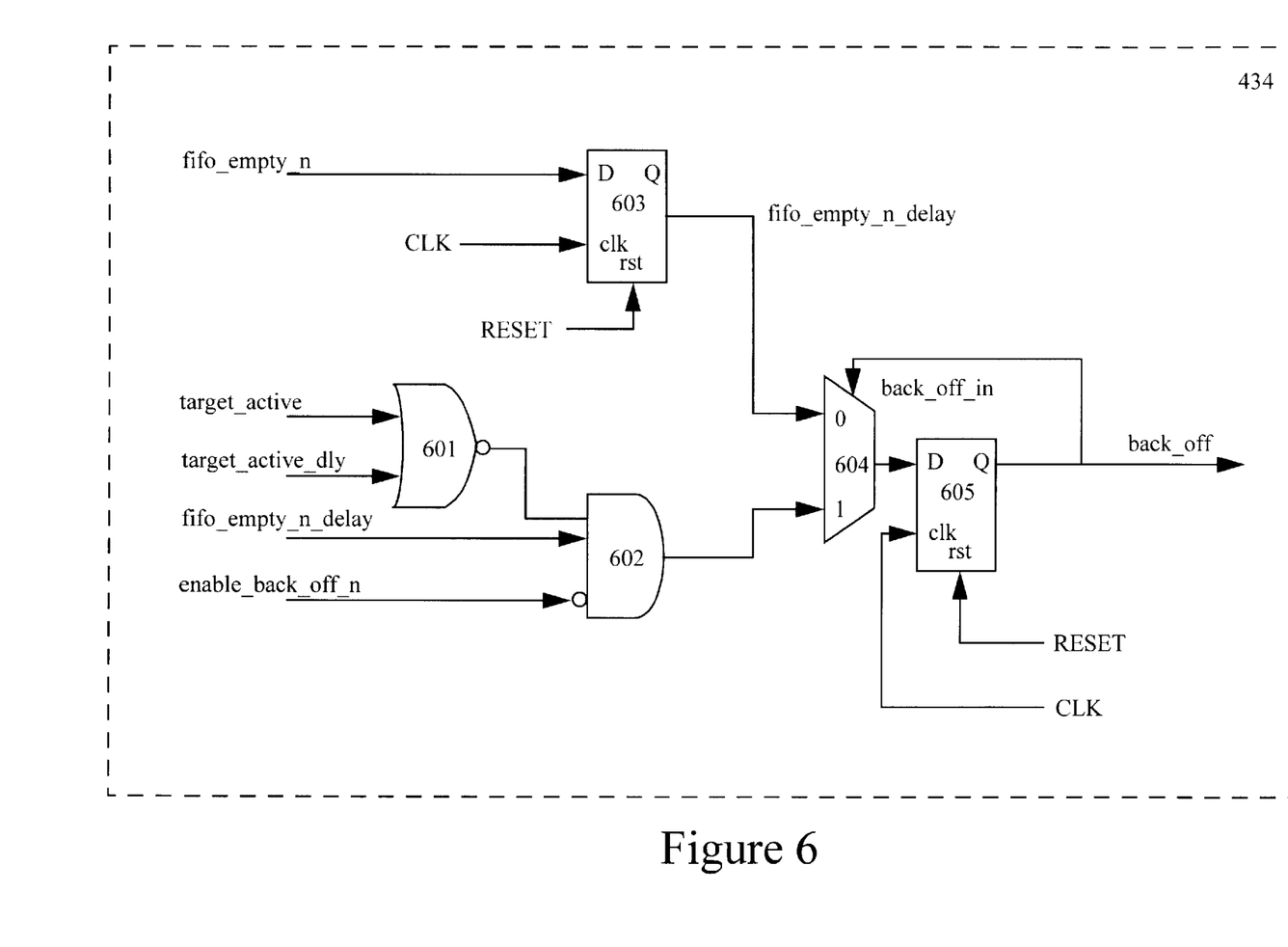
FIG. 6 is a block diagram of the hardware in accordance with the present invention.

FIG. 6 illustrates the hardware implementation of the present invention. The present invention resides in host bus interface 434. For the sake of clarity and brevity, only the relevant portion of host bus interface 334 is shown in FIG. 5. As shown in FIG. 6, the present invention consists of NOR-gate 601, AND-gate 602, flip-flop 603, multiplexer 604, and flip-flop 605. Signal fifo_empty_n indicates whether there is any data in the FIFO buffer in network controller 324 which is used to temporarily store data received from PCI bus 334. When signal fifo_empty_n is LOW, then the FIFO buffer is empty. On the other hand, when signal fifo_empty_n is HIGH, then the FIFO buffer has some data in it. Accordingly, when signal fifo_empty_n is HIGH, it indicates that a posted write transaction is incomplete. It should be clear to a person of ordinary skill in the art that signal fifo_empty_n can easily be generated. Generally, when the data level inside a FIFO buffer reaches a predetermined level, signal fifo_empty_n is asserted HIGH. Similarly, when the data level inside the FIFO buffer drops below the level, signal fifo_empty_n goes LOW.

Signal fifo_empty_n is provided as an input to flip-flop 603. Flip-flop 603 also receives as inputs system clock signal CLK and reset signal RESET. Flip-flop 603 outputs signal fifo_empty_n_delay which is a delayed version of signal fifo_emtpy_n. Signal fifo_empty_n_delay is provided as inputs to multiplexer 604 and AND-gate 602. Delayed signal fifo_empty_n_delay is used instead of signal fifo_empty_n to ensure that there is no data left after the FIFO buffer has been empty so that misleading information is not provided to falsely trigger a posted write transaction incomplete.

Signal target_active is provided as an input to NOR-gate 601. Signal target_active indicates that the bus target is currently accepting data. In other words, there is a bus transaction initiation. A second input to NOR-gate 601 is signal target_active_dly which is a delayed version of signal target_active. By providing both signals target_active and target_active_dly to NOR-gate 601, the same state is ensured an extra clock cycle beyond the end of the transaction initiation. This allows the transaction initiation to be more easily detected. In general, target_active signal is generated if there is an on-going transaction that is intended for the device (e.g., network controller 324) that the current invention is implemented. Accordingly, it should be clear to a person of ordinary skill in the art that target_active signal can be generated by combining PCI bus signals FRAME indicating the occurrence of a bus transaction, TRDY indicating that the bus target is ready to receives data, IRDY indicating that the bus master is ready to send data, and DEVSEL indicating that the current device (e.g., network controller 324) is being selected for the transaction.

The third input to AND-gate 602 is signal enable_back_off_n which is used to turn on the retry mechanism of the current invention. Preferably, signal enable_back_off_n is a bit in a control register that is set by host CPU 302. Signal enable_back_off_n is asserted LOW. As such, signal enable_back_off_n is inverted before being provided to AND-gate 502. The output of AND-gate 602 is provided as a second input to multiplexer 604. Flip-flop 605 receives as inputs an output from multiplexer 604 (signal back_off_in), a system clock signal CLK, and a reset signal RESET from PCI bus 334. Flip-flop 605 outputs a back_off (bus retry) signal which is fed back to multiplexer 604 to be used as a select signal. In so doing, when there is an incomplete posted write transaction inside the target device, a transaction initiation, and the retry mechanism is enabled, a back-off (bus retry) signal is asserted HIGH. Back-off signal is used in generating a stop signal to retry the next transaction. The transaction initiation is then resent at a later time.

Figure 7:
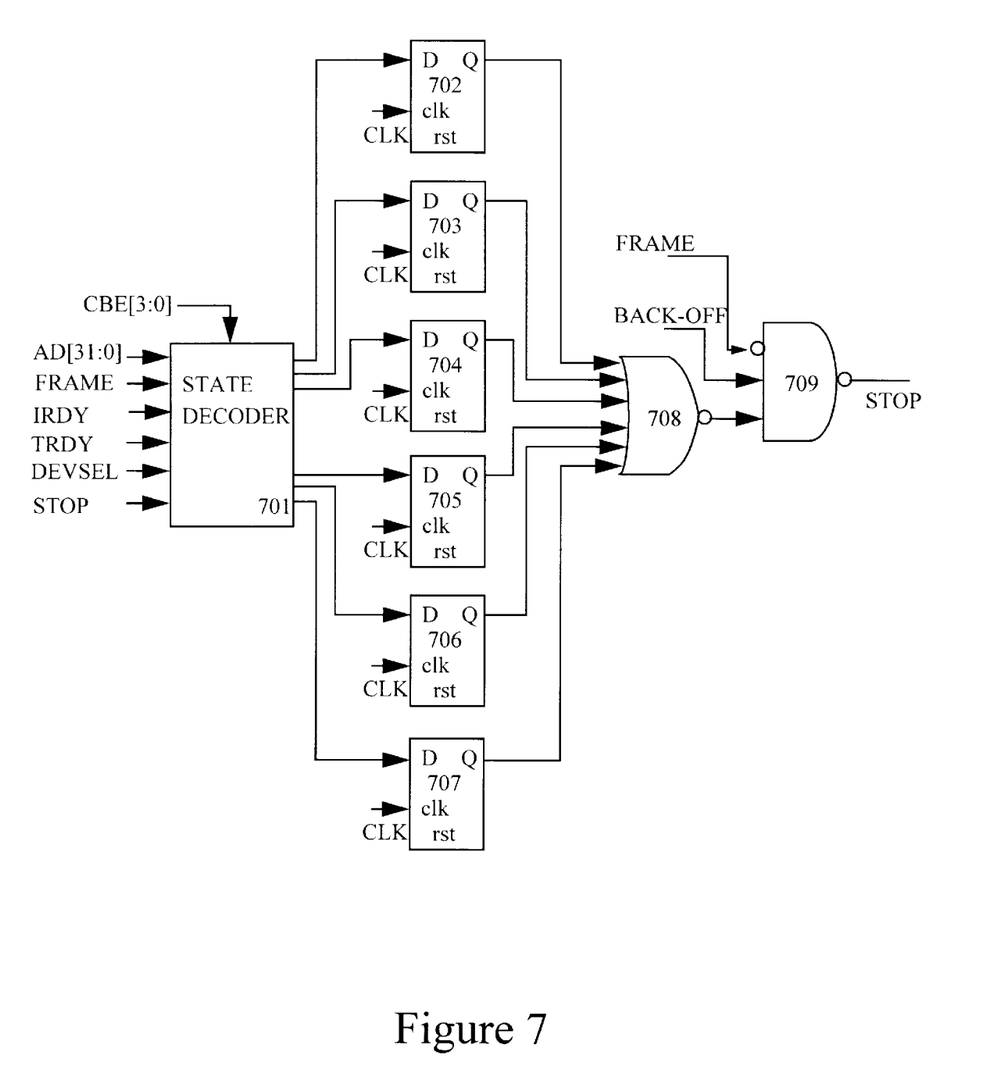
FIG. 7 is a block diagram of the hardware required to generate a bus retry signal from the back_off signal generated in FIG. 6.

FIG. 7 illustrates, as an example, a block diagram of the hardware required to generate a bus retry signal from the back_off signal. As shown in FIG. 7, state decoder 701 receives as inputs PCI bus signals AD[31:0], CBE[3:0], FRAME, IRDY, TRDY, DEVSEL, and STOP. Signal AD[31:0] carries address and data information related to transactions sent over PCI bus. Signal CBE[3:0] carries command and byte enable information. FRAME signal indicates whether a transaction occurs on the PCI bus. IRDY signal indicates whether the bus master (initiator) is ready to send data over the PCI bus. TRDY signal indicates whether the bus target is ready to receive data over the PCI bus. DEVSEL signal is asserted by the device at-hand and indicates to the initiator that it is being selected for a pending bus transaction. STOP signal indicates whether the transaction is going to end at the next clock cycle. Accordingly, state decoder 701, which is a state machine, analyzes the states of the PCI bus signals and generates code sequences which represent the different states of network controller 324. It should be clear to a person of ordinary skill in the art that the implementation of a state decoder 601 is well-known and common practice.

The outputs of state decoder 601 are supplied to flip-flops 702–707 which are used to synchronize the signals according to system clock signal CLK. Flip-flops 702–707 can be reset by reset signal RESET. The outputs of flip-flops 702–707 are provided as inputs to NOR-gate 608 which acts as a comparator to determine if the code sequence from state decoder 701 matches the desired sequence. When the code sequence from state decoder 701 are all zeros, NOR-gate 708 outputs a HIGH value. Otherwise, NOR-gate 708 outputs a LOW value. The output of NOR-gate 708 is provided as an input to NAND-gate 709. Other inputs to NAND-gate 709 are signal FRAME and back-off signal. When FRAME signal is asserted LOW indicating that there is a bus transaction occuring and back-off signal is HIGH indicating that there is an incomplete posted transaction and a transaction initiation, NAND-gate 709 outputs a LOW STOP signal to PCI bus 334 which stops the current transaction from completing. Otherwise, NAND-gate 709 outputs a HIGH STOP signal which means that no action needs to be taken.

Figure 8:
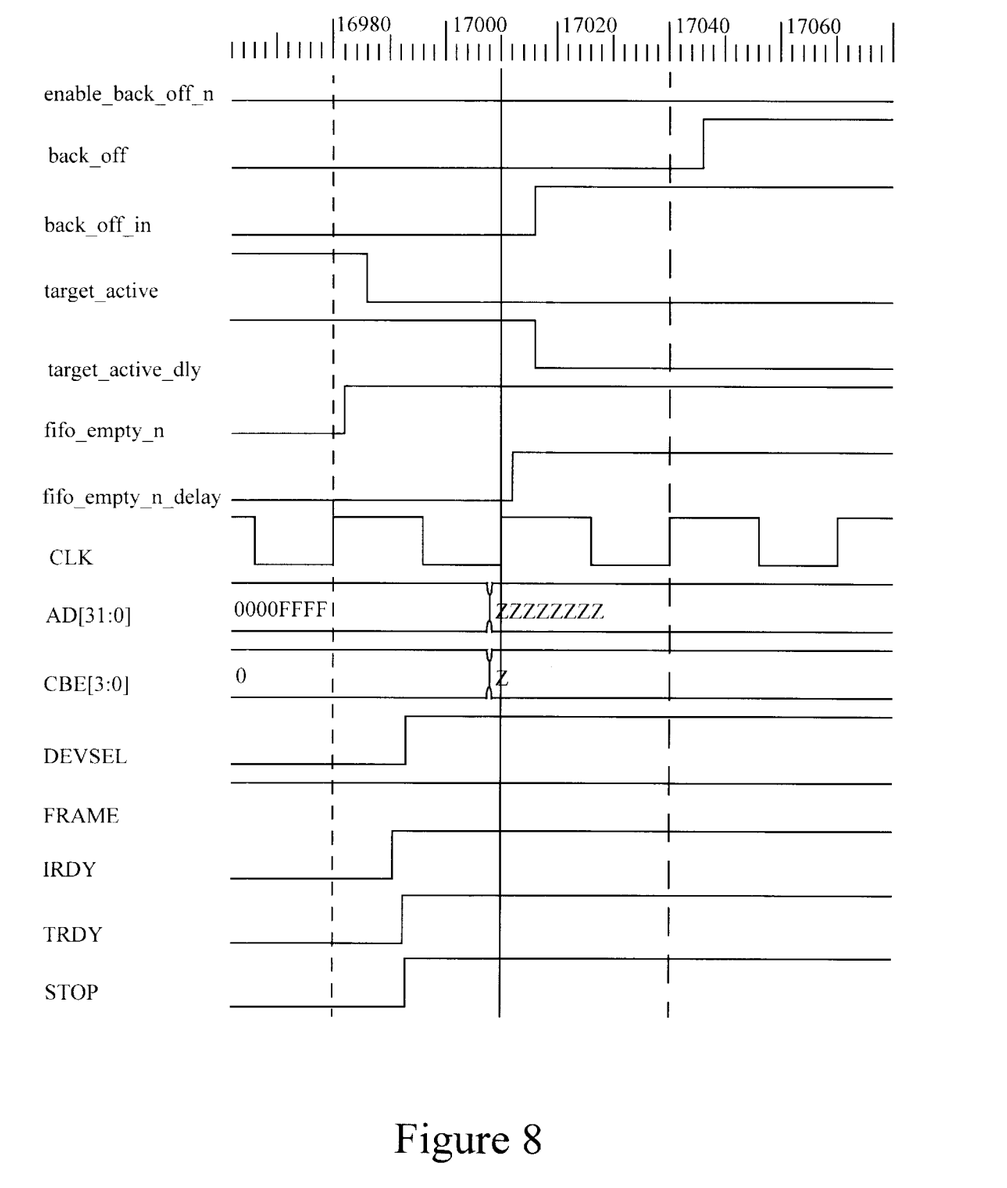
FIG. 8 is an exemplary timing diagram for the start of a posted write transaction processing

Reference is now made to FIG. 8 illustrating, as an example, a timing diagram for the start of a posted write transaction processing. In FIG. 8, the signals in upper cases are PCI bus signals and the signals in lower cases are signals from FIG. 6. As shown in FIG. 8, the FIFO buffer is empty as indicated by a LOW fifo_empty_n signal and its delayed counterpart fifo_empty_n_delay signal. Beginning prior to time T0, PCI bus signals IRDY is asserted LOW indicating that the bus master is sending data. Similarly, TRDY is asserted LOW indicating that the bus target is receiving data. Furthermore, device select signal DEVSEL is also asserted LOW prior to time T0 indicating that the network controller 324 is selected for the current transaction. Signals IRDY, TRDY, and DEVSEL all become HIGH after time T0 indicating that the write transaction is complete. Signal enable_back_off_n is asserted LOW throughout indicating that the retry mechanism is enabled. Signals target_active and its delayed counterpart target_active_n_delay are asserted LOW at approximately time T0 and T1, respectively. This indicates that the bus target is receiving data (i.e., signifying a transaction completion). Because signal fifo_empty_n and its delayed counterpart fifo_empty_n_delay are HIGH indicating that the FIFO buffer inside the target device has data inside, signal back_off_in is asserted HIGH at time T1. At time T2, a clock cycle later, signal back_off is asserted HIGH which signals host CPU 302 to perform a bus retry on the transaction initiation.

Figure 9:
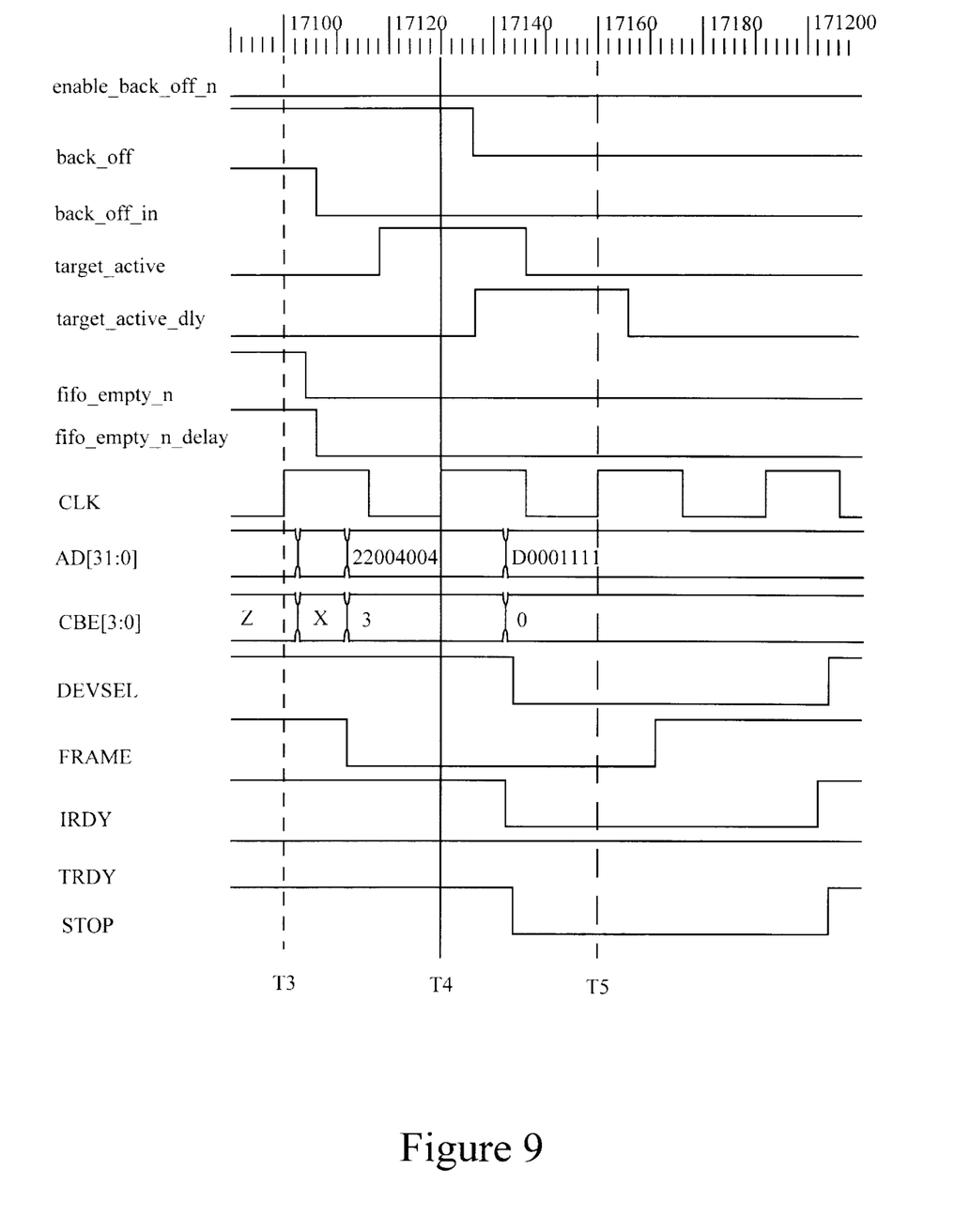
FIG. 9 is an exemplary timing diagram for the end of a posted write transaction processing.

FIG. 9 illustrates, as an example, a timing diagram for the end of a posted write transaction processing. In FIG. 9, the signals in upper cases are PCI bus signals and the signals in lower cases are signals from FIG. 6. As shown in FIG. 9, the FIFO buffer initially has some data inside as indicated by a HIGH fifo_empty_n signal and its delayed counterpart fifo_empty_n delay signal. Subsequent to time T3, signal FRAME is asserted LOW indicating that there is a transaction initiation and new data is being sent over the PCI bus. Signal enable_back_off_n is asserted LOW throughout indicating that the retry mechanism is enabled. Moreover, both signals fifo_empty_n and fifo_empty_n_delay are HIGH prior to time T3. Accordingly, signal back_off_in is HIGH at time T3 and signal back_off is HIGH until after time T4. As such, signal STOP is asserted HIGH until a little after time T4 to hold off on any transaction initiation. At approximately time T4, PCI bus signals IRDY is asserted LOW indicating that the bus master is again sending data. At this time, signal FRAME is still asserted LOW to indicate that a transaction initiation is coming. Signals target_active and its delayed counterpart target_active_n_delay are asserted HIGH at approximately time T4 and T5, respectively. This indicates that the bus target stops receiving data between time T4–T5. At time T4, signals fifo_empty_n and fifo_empty_n_dly are asserted LOW to indicate that the data was taken out pf the FIFO. However, the PCI bus transaction was initiated precisely at this clock (T4) which would have corrupted some data. To avoid this, back-off signal is held asserted for the first clock that signal FRAME is LOW at T4. This indicates to the state decoder of FIG. 7 that the transaction starting at T4 should be retried by asserting a STOP signal at time T5.

The preferred embodiment of the present invention, a bus retry mechanism to prevent data from being corrupted prior to reaching the final destination, is thus described. While the present invention has been described in particular embodiments, the present invention should not be construed as limited by such embodiments, but rather construed according to the below claims.

What is claimed is:

1. A method for preventing data sent to a target device over the bus from being corrupted prior to reaching a final destination, the method comprising:

determining whether a posted write transaction is incomplete;

determining whether the target device is receiving new data; and if the posted write transaction is incomplete and the target device is receiving new data, generating a back-off signal as an output to be used in generating a bus retry signal.

2. The method of claim 1, wherein the signal indicating whether a posted write transaction is incomplete is based on whether a first-in-first-out (FIFO) buffer inside the target device, which is used to temporarily store the data from the bus prior to being transferred to the final destination, has a predetermined amount of data.

3. The method of claim 1, wherein the signal indicating whether the target device is receiving new data is based on bus control signals indicating whether a bus transaction occurs, whether a bus target is receiving data, whether a bus master is sending data, and whether the target device is selected for receiving new data.

4. An apparatus to prevent data sent to a target device over a bus from being corrupted prior to reaching a final destination, the apparatus comprising:

a first circuit coupled to the target device and the bus, the first circuit determining whether a write transaction is incomplete and whether there is a bus transaction initiation for the target device indicating that the target device is receiving new data; and a second circuit coupled to the first circuit, the second circuit generating a back-off signal to be used in generating a bus retry signal when the write transaction is incomplete and there is a bus transaction initiation for the target device.

5. The apparatus of claim 4, wherein the first circuit comprises:

a first delay circuit coupled to the target device, the first delay circuit receiving as input the signal indicating whether the write transaction is incomplete, the first delay circuit delaying the signal indicating whether the write transaction is incomplete by a predetermined number of clock cycles;

a NOR-gate coupled to the target device, the NOR-gate receiving as a first input a signal indicating whether there is a bus transaction initiation for the target device, the NOR-gate receiving as a second input the signal indicating whether there is a bus transaction initiation for the target device delayed by a predetermined number of clock cycles; and an AND-gate receiving as inputs an output from the first delay circuit and an output from the NOR-gate.

6. The apparatus of claim 5, wherein the second circuit comprises:

a multiplexer receiving as inputs an output from the AND gate and the output from the first delay circuit; and a second delay circuit receiving as input an output of the multiplexer, the second delay circuit providing the back-off signal as an output wherein the back-off signal is fed back to the multiplexer as a select signal.

7. The apparatus of claim 5, wherein the first and second delay circuits are D-type flip-flops, the D-type flip-flops further receiving as inputs clock and reset signals from the bus.

8. The apparatus of claim 5, wherein the AND-gate further receiving an enable signal to be used as an on-off switch for the apparatus.

9. The apparatus of claim 4, wherein the signal indicating whether a write transaction is incomplete is based on whether a first-in-first-out (FIFO) buffer inside the target device has a predetermined amount of data.

10. The apparatus of claim 4, wherein the signal indicating whether there is a bus transaction initiation for the target device is based on bus control signals indicating whether a bus transaction occurs, whether a bus target is ready to receive data, whether a bus master is ready to send data, and whether the target device is selected for receiving new data.

11. The apparatus of claim 4, wherein the computer bus is a peripheral component interconnect (PCI) local bus.

12. A computer system comprising:
   a host processor;
   a system memory;
   a bus coupling the host processor to the system memory; and
   a peripheral controller connected to the bus, the peripheral controller having an apparatus to prevent data sent to the network controller over the bus from being corrupted prior to reaching a final destination, the apparatus comprising:
      a first circuit coupled to the target device and the bus, the first circuit determining whether a write transaction is incomplete and whether there is a bus transaction initiation for the target device indicating that the target device is receiving new data; and
      a second circuit coupled to the first circuit, the second circuit generating a back-off signal to be used in generating a bus retry signal when the write transaction is incomplete and there is a bus transaction initiation for the target device.

13. The computer system of claim 12, wherein the first circuit comprises:
   a first delay circuit coupled to the target device, the first delay circuit receiving as input the signal indicating whether the write transaction is incomplete, the first delay circuit delaying the signal indicating whether the write transaction is incomplete by a predetermined number of clock cycles;
   a NOR-gate coupled to the target device, the NOR-gate receiving as a first input a signal indicating whether there is a bus transaction initiation for the target device, the NOR-gate receiving as a second input the signal indicating whether there is a bus transaction initiation for the target device delayed by a predetermined number of clock cycles; and
   an AND-gate receiving as inputs an output from the first delay circuit and an output from the NOR-gate.

14. The computer system of claim 13, wherein the second circuit comprises:
   a multiplexer receiving as inputs an output from the AND gate and the output from the first delay circuit; and
   a second delay circuit receiving as input an output of the multiplexer, the second delay circuit providing the back-off signal as an output wherein the back-off signal is fed back to the multiplexer as a select signal.

15. The computer system of claim 13, wherein the first and second delay circuits are D-type flip-flops, the D-type flip-flops further receiving as inputs clock and reset signals from the bus.

16. The computer system of claim 13, wherein the AND-gate further receiving an enable signal to be used as an on-off switch for the apparatus.

17. The computer system of claim 12, wherein the signal indicating whether a write transaction is incomplete is based on whether a first-in-first-out (FIFO) buffer inside the target device has a predetermined amount of data.

18. The computer system of claim 12, wherein the signal indicating whether there is a bus transaction initiation for the target device is based on bus control signals indicating whether a bus transaction occurs, whether a bus target is ready to receive data, whether a bus master is ready to send data, and whether the target device is selected for receiving new data.

19. The computer of claim 12, wherein the computer bus is a peripheral component interconnect (PCI) local bus.

* * * * *